US007181733B2

(12) United States Patent
Sarcar

(10) Patent No.: US 7,181,733 B2
(45) Date of Patent: Feb. 20, 2007

(54) METHOD AND APPARATUS FOR DETECTING AN OVERFLOW CONDITION IN A KERNEL STACK DURING OPERATING SYSTEM DEVELOPMENT

(75) Inventor: Kanoj Sarcar, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 684 days.

(21) Appl. No.: 10/346,520

(22) Filed: Jan. 16, 2003

(65) Prior Publication Data

US 2004/0143824 A1 Jul. 22, 2004

(51) Int. Cl.
*G06F 9/45* (2006.01)
*G06F 9/44* (2006.01)

(52) U.S. Cl. ............ 717/140; 717/141; 717/130; 717/131

(58) Field of Classification Search .......... 717/140, 717/145, 130, 171, 160, 161, 124; 711/131, 711/132, 100, 163; 719/318; 710/310; 726/23
See application file for complete search history.

(56) References Cited

U.S. PATENT DOCUMENTS

| 5,950,221 | A | * | 9/1999 | Draves et al. ............. 711/100 |
| 6,006,323 | A | * | 12/1999 | Ma et al. .................... 712/202 |
| 6,075,940 | A | * | 6/2000 | Gosling ...................... 717/126 |
| 6,167,488 | A | * | 12/2000 | Koppala ..................... 711/132 |
| 6,578,094 | B1 | * | 6/2003 | Moudgill ...................... 710/57 |
| 6,772,410 | B1 | * | 8/2004 | Komatsu et al. ............ 717/124 |
| 6,779,180 | B1 | * | 8/2004 | Palm ........................... 718/100 |
| 6,826,697 | B1 | * | 11/2004 | Moran .......................... 726/23 |
| 6,993,663 | B1 | * | 1/2006 | Paya et al. .................. 711/163 |
| 2003/0065929 | A1 | * | 4/2003 | Milliken ...................... 713/189 |
| 2004/0019744 | A1 | * | 1/2004 | Boucher ...................... 711/132 |
| 2004/0025084 | A1 | * | 2/2004 | Krueger ....................... 714/35 |
| 2004/0030788 | A1 | * | 2/2004 | Cimo et al. ................. 709/229 |

OTHER PUBLICATIONS

John Regehr et al., "Eliminating Stack Overflow by Abstract Interpretation", Nov. 2005, ACM Press, vol. 4, No. 4, pp. 751-778.*

* cited by examiner

*Primary Examiner*—Wei Zhen
*Assistant Examiner*—Anna Deng
(74) *Attorney, Agent, or Firm*—Park, Vaughan & Fleming, LLP

(57) ABSTRACT

One embodiment of the present invention provides a system with a mechanism that facilitates determining whether a kernel stack will overflow during development of an operating system. During execution of the operating system, the operating system executes a procedure. Upon entering the procedure, after the current stack pointer has been automatically adjusted to provide stack space for the procedure, the system retrieves the current stack pointer for the process, and determines the stack limit for the process. The system then compares the current stack pointer to the stack limit to determine if the process will cause, or is likely to cause a stack overflow. If a stack overflow will occur, or is likely to occur, the system indicates the existence of a stack overflow condition.

18 Claims, 2 Drawing Sheets

METHOD AND APPARATUS FOR DETECTING AN OVERFLOW CONDITION IN A KERNEL STACK DURING OPERATING SYSTEM DEVELOPMENT

BACKGROUND

1. Field of the Invention

The present invention relates to the process of developing operating systems for computers. More specifically, the present invention relates to a method and an apparatus for detecting a kernel stack overflow condition during development of an operating system.

2. Related Art

The problem of kernel stack overflow arises frequently during operating system development. As kernel code makes procedure calls, each successive procedure call allocates a stack frame on the kernel stack. Upon completion of a procedure call, the stack frame for the procedure call is removed from the top of the kernel stack. When procedure calls become deeply nested, a large amount of stack space can potentially be used. In some instances, so much stack space is used that the stack grows beyond its allocated space and stack overflow results. During a stack overflow, the system starts overwriting information in memory located past the end of the stack. Operating systems are typically designed to handle stack overflow conditions, but stack overflow conditions are not always detected and handled successfully, especially during the operating system development process, when the kernel code is not stable.

Stack overflow conditions can also arise when procedures temporarily use the stack to store state information. Stack overflows of this nature can be extremely difficult to diagnose, especially because they can randomly corrupt memory being used for unrelated purposes.

Traditionally, stack overflow detection has been solved a number of ways. One common method is to use hardware support to make memory just beyond the stack inaccessible. In this case, if an executing code tries to access memory beyond the stack boundary, an overflow is detected by the hardware and appropriate action is taken. However, this technique can greatly complicate hardware development and can potentially degrade system performance.

Another technique for detecting stack overflows involves analyzing the stack during context swapping operations. In operating systems that support context swapping, each thread has its own stack, and the context-swapping mechanism swaps threads in and out to facilitate time sharing. When a context switch occurs, it is possible to analyze the stack to determine if it has overrun its boundaries. While sometimes useful, this technique does not immediately provide notification when the stack pointer exceeds its boundaries. Hence, the overflow can potentially corrupt critical data before the stack overflow is detected, making it hard to diagnose the problem.

What is needed is a method and an apparatus for detecting stack overflow conditions before they occur without the limitations described above.

SUMMARY

One embodiment of the present invention provides a system with a mechanism that facilitates determining whether a kernel stack will overflow during development of an operating system. During execution of the operating system, the operating system executes a procedure. Upon entering the procedure, after the current stack pointer has been automatically adjusted to provide stack space for the procedure, the system retrieves the current stack pointer for the process, and determines the stack limit for the process. The system then compares the current stack pointer to the stack limit to determine if the process will cause, or is likely to cause a stack overflow. If a stack overflow will occur, or is likely to occur, the system indicates the existence of a stack overflow condition.

In a variation of the embodiment, comparing the current stack pointer to the stack limit to determine if the process will cause a stack overflow involves estimating how much stack space the procedure will use, and then using the estimate to determine if executing the procedure will cause, or is likely to cause a stack overflow condition.

In a variation of the embodiment, the system halts execution of the operating system if a stack overflow condition exists.

In a variation of the embodiment, the system prints a backtrace of the process execution if a stack overflow condition exists.

In a variation of the embodiment, the steps of retrieving the current stack pointer, determining the stack base and the stack limit, comparing the current stack pointer to the stack limit, and indicating the existence of the stack overflow condition are performed by code that is inserted into the operating system at compile time to detect the existence of a stack overflow condition.

In a further variation of the embodiment, the code is inserted by a compiler into a procedure that is called from the entry of each procedure for profiling purposes.

In a variation of the embodiment, the code that performs the steps of retrieving the current stack pointer, determining the stack limit, comparing the current stack pointer to the stack limit, and indicating the existence of the stack overflow condition is generated in assembly code so that the code does not use any stack space.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
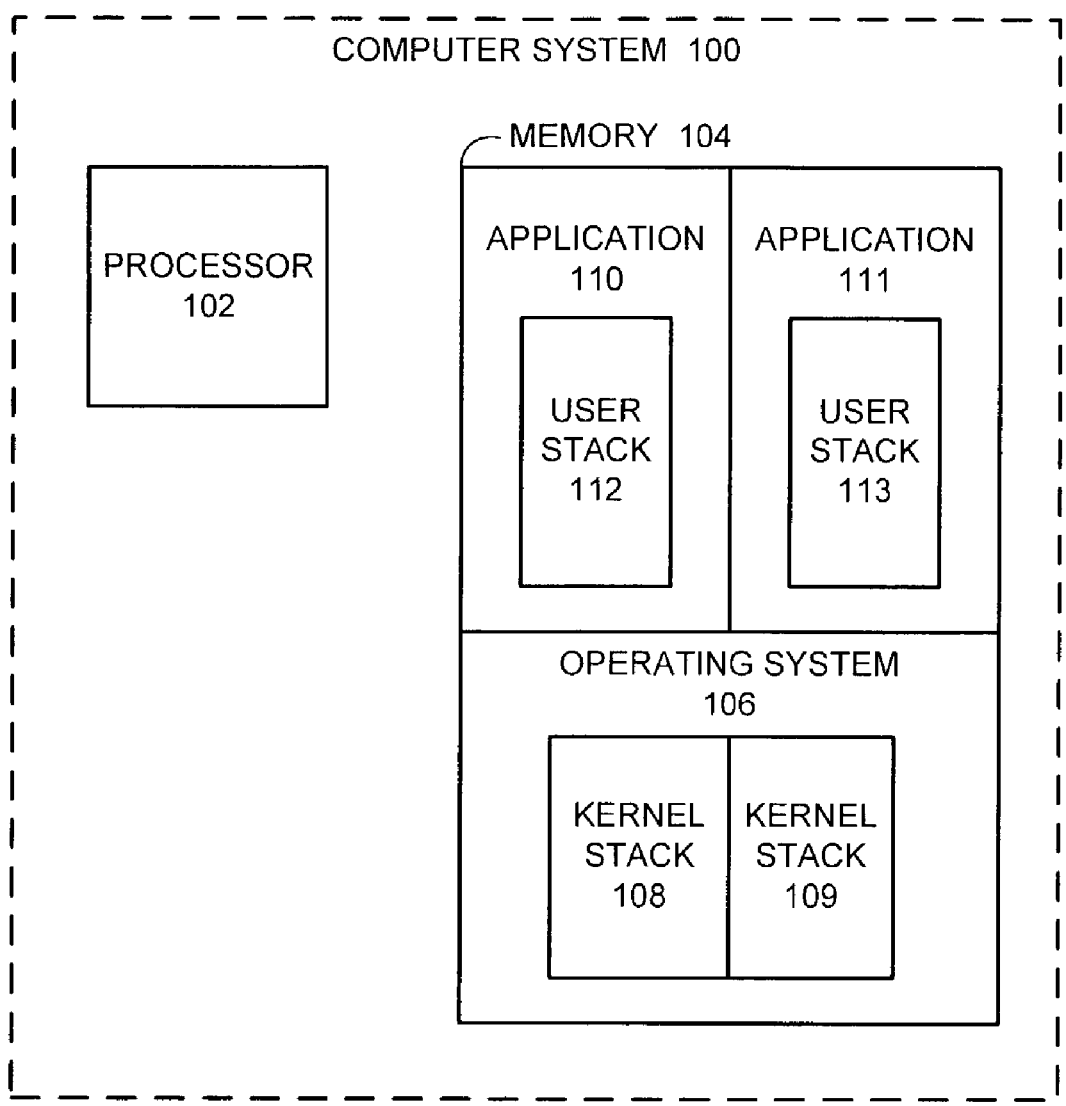
FIG. 1 presents a computer system in accordance with an embodiment of the present invention.

FIG. 1 presents computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

Computer system 100 includes processor 102 and memory 104. Processor 102 can generally include any type of processor. Memory 104 can include any type of memory within a computer system. Moreover, memory 104 contains operating system 106 as well as applications 110–111, which run on top of operating system 106. Application 110 includes a user stack 112, which contains stack frames for procedure calls executed by application 110. Similarly, application 111 includes user stack 113, which contains stack frames for procedure calls executed by application 111.

Operating system 106 contains kernel stacks 108 and 109. Kernel stack 108 contains stack frames for operating system calls associated with the execution of application 110. Similarly, kernel stack 109 contains stack frames for operating system calls associated with the execution of application 111.

Preparing Code for Stack Overflow Detection

Figure 2:
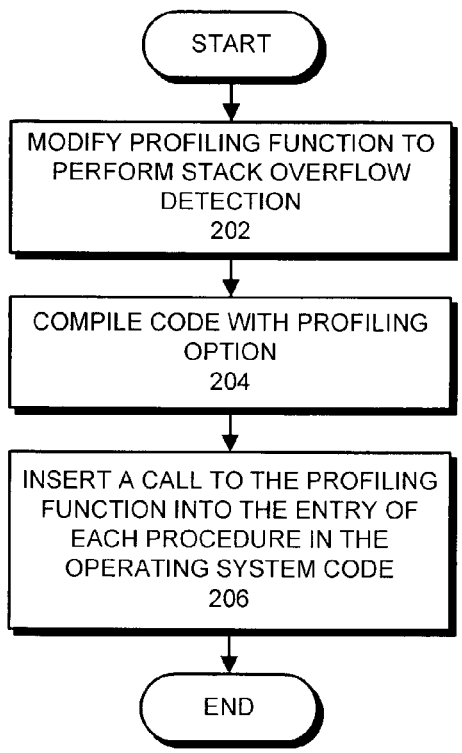
FIG. 2 presents a flowchart illustrating the process of preparing the code for stack overflow detection in accordance with an embodiment of the present invention.

FIG. 2 presents a flowchart illustrating the process of preparing the operating system for stack overflow detection in accordance with an embodiment of the present invention. One embodiment of the present embodiment provides a mechanism for performing stack overflow detection for kernel stack 108. This aids in the operating system development process by alerting a developer to an overflow condition before the overflow occurs. In another embodiment of the present invention, the same methods can be used to detect stack overflows for user stack 112.

One embodiment of the present invention makes use of existing functionality that is present in many compilers for debugging purposes and performance tuning. Many compilers provide a mechanism for profiling procedure calls. One example of this is gprof. Profiling typically operates by inserting a call to a profiling procedure at the entry of every "real" procedure in the program. This profiling procedure contains code that records which real procedure call is being invoked so that a developer can determine the program's execution path. The present invention builds upon this existing infrastructure by adding the stack overflow detection code to the existing profiling procedure.

In one embodiment of the present invention, whenever the compiler creates a binary image of operating system 106 from source code, the compiler determines the size of a stack frame for each procedure. The compiler also inserts a call to the profiling function/procedure at the entry to each real procedure. This profiling function normally records parameters whenever a real procedure is called. However, in one embodiment of the present invention, code to detect an overflow in kernel stack 108 is included in the profiling function.

Hence, one embodiment of the present invention modifies the profiling function to perform stack overflow detection of kernel stack 108 in addition to, or instead of performing normal profiling operations (step 202). Once the profiling function has been modified, the operating system code is compiled with the profiling option (step 204) and a call to the profiling function is inserted into the entry of every procedure in the executable binary image for operating system 106 (step 206).

For example, in the GNU/Linux/SparcV9 environment, the gcc compiler has a "-pg" option that is used to transparently insert calls to a profiling procedure called mcount ( ) into the entry of each real procedure call. In the stack overflow detection mode, the mcount ( ) procedure is modified to compare processor 102's stack pointer register (and possibly a variable indicating how much space in kernel stack 108 might be used up by the real procedure) against the stack limit for the process. If the stack usage indicates that an overflow condition will occur or is imminent, an operating system trap is initiated, which alerts a developer, or alternatively, causes the system to take other appropriate actions.

Note that in one embodiment of the present invention, the stack overflow detection code does not directly replace the profiling code, but is instead invoked with a separate configuration option at kernel compile time.

Process of Detecting a Stack Overflow Condition

Figure 3:
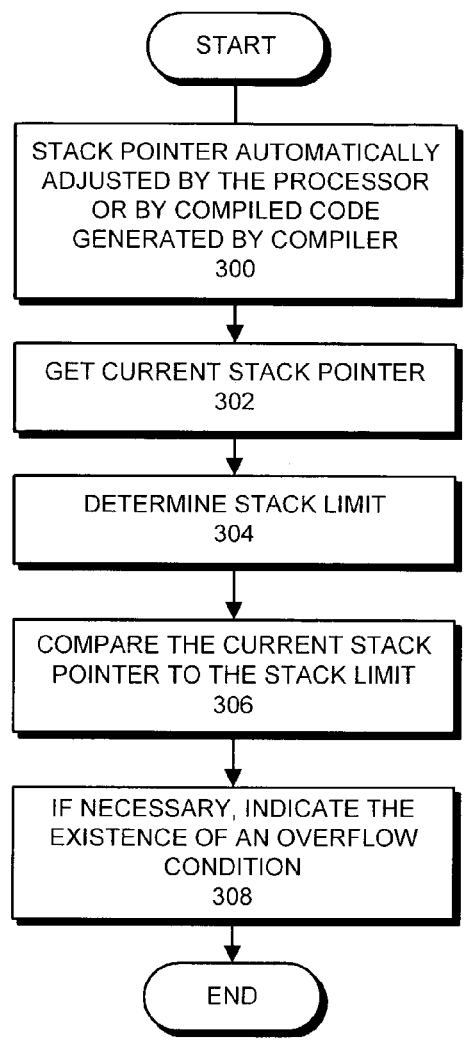
FIG. 3 presents a flowchart illustrating the process of detecting a stack overflow condition in accordance with an embodiment of the present invention.

FIG. 3 presents a flowchart illustrating the process of detecting a stack overflow condition in accordance with an embodiment of the present invention. During the compilation process, the compiler estimates a maximum amount of stack space that each procedure will use. This estimate is used to automatically allocate stack space for each procedure at run time.

When a procedure is called during run time, the system automatically adjusts the stack pointer to make room for a stack frame for the procedure (step 300). This stack pointer adjustment can be accomplished by a special processor instruction that automatically adjusts the stack pointer. Alternatively, the stack pointer can be adjusted by executing compiled code that adjusts the stack pointer.

Next, system retrieves the stack pointer (step 302) and determines the stack limit (step 304). The system then compares the current stack pointer with the stack limit (step 306). If the current stack pointer is close to exceeding or is likely to exceed the stack limit, this means that the stack frame for the current procedure exceeds the stack limit, or is likely to exceed the stack limit with the next procedure call, and hence, a stack overflow condition exists.

Once a stack overflow condition has been detected, the system indicates the existence of the condition (step 308). Optionally at this point, other actions can be taken. In one embodiment of the present invention, upon indicating a stack overflow condition, the system halts the current process and prints a backtrace of the process execution. This helps the developer in identifying the section of code that has caused the stack overflow, which in turn allows the developer to modify the code to avoid future stack overflows.

In another embodiment, the system uses the indication of an impending stack overflow to dynamically allocate more stack space, thus avoiding the stack overflow condition altogether.

Note that care must be taken to use an alternate stack for code that takes these actions, so that the code does not further exacerbate the stack overflow problem.

Upon completion of the development process, or when the developer is reasonably assured that no more stack overflow conditions will occur, the code can be recompiled without the profiling option, thereby eliminating the overhead of constantly checking for a stack overflow condition.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for proactively determining whether a kernel stack will overflow during development of an operating system, comprising:
   executing a procedure call in an operating system;
   upon entering the procedure,
      retrieving a current stack pointer for a process associated with the procedure, after the current stack pointer has been automatically adjusted to provide stack space for the procedure,
      determining a stack limit for the process,
      comparing the current stack pointer to the stack limit to determine if the process will cause a stack overflow, and
      if the current process will cause a stack overflow, indicating the existence of a stack overflow condition; and
      during a prior compilation, the compiler estimates how much stack space procedure will use, which allows the stack pointer to be automatically adjusted during execution of the procedure at run time.

2. The method of claim 1, further comprising halting execution of the operating system if a stack overflow condition exists.

3. The method of claim 1, further comprising printing a backtrace of the process execution if a stack overflow condition exists.

4. The method of claim 1, wherein the steps of retrieving the current stack pointer, determining the stack base and the stack limit, comparing the current stack pointer to the stack limit, and indicating the existence of the stack overflow condition are performed by code that is inserted into the operating system at compile time to detect the existence of a stack overflow condition.

5. The method of claim 4, wherein the code is inserted by a compiler into a procedure that is called from the entry of each procedure for profiling purposes.

6. The method of claim 1, wherein the code that performs the steps of retrieving the current stack pointer, determining the stack limit, comparing the current stack pointer to the stack limit, and indicating the existence of the stack overflow condition is generated in assembly code so that the code does not use any stack space.

7. A computer-readable storage medium storing instructions that when executed by a computer cause the computer to perform a method for proactively determining whether a kernel stack will overflow during development of an operating system, the method comprising:
   executing a procedure call in an operating system;
   upon entering the procedure,
      retrieving a current stack pointer for a process associated with the procedure, after the current stack pointer has been automatically adjusted to provide stack space for the procedure,
      deyermining a stack limit for the process,
      comparing the current stack pointer to the stack limit to determine if the process will cause a stack overflow, and
      if the current process will cause a stack overflow, indicating the existence of a stackoverflow condition; and
      during a prior compilation, the compiler estimates how much stack space the procedure will use, which allows the stack pointer to be automatically adjusted during execution of the procedure at run time.

8. The computer-readable storage medium of claim 7, wherein the method further comprises halting execution of the operating system if a stack overflow condition exists.

9. The computer-readable storage medium of claim 7, wherein the method further comprises printing a backtrace of the process execution if a stack overflow condition exists.

10. The computer-readable storage medium of claim 7, wherein the steps of retrieving the current stack pointer, determining the stack base and the stack limit, comparing the current stack pointer to the stack limit, and indicating the existence of the stack overflow condition are performed by code that is inserted into the operating system at compile time to detect the existence of a stack overflow condition.

11. The computer-readable storage medium of claim 10, wherein the code is inserted by a compiler into a procedure that is called from the entry of each procedure for profiling purposes.

12. The computer-readable storage medium of claim 7, wherein the code that performs the steps of retrieving the current stack pointer, determining the stack limit, comparing the current stack pointer to the stack limit, and indicating the existence of the stack overflow condition is generated in assembly code so that the code does not use any stack space.

13. An computer apparatus for proactively determining whether a kernel stack will overflow during development of an operating system, comprising:
   an execution mechanism configured to execute a procedure call during execution of an operating system;
   a retrieval mechanism configured to retrieve a current stack pointer and a stack limit for a process associated with the procedure call, after the current stack pointer has been automatically adjusted to provide stack space for the procedure;
   a comparison mechanism configured to compare the current stack pointer to the stack limit to determine if the process will cause a stack overflow;
   an indication mechanism configured to indicate the existence of a stack overflow condition if the current process will cause a stack overflow; and
   a compilation mechanism configured to estimate how much stack space the procedure will use, which allows the stack pointer to be automatically adjusted during execution of the procedure at run time.

14. The computer apparatus of claim 13, further comprising a termination mechanism that is configured to halt execution of the operating system if a stack overflow condition exists.

15. The computer apparatus of claim 13, wherein the indication mechanism is further configured to print a backtrace of the process execution if a stack overflow condition exists.

16. The computer apparatus of claim 13, wherein the retrieval mechanism, the determination mechanism, the comparison mechanism, and the indication mechanism are further configured by a compiler mechanism.

17. The computer apparatus of claim 16, wherein the compiler mechanism configures the retrieval mechanism, the determination mechanism, the comparison mechanism by inserting code into a procedure that is called from the entry of each procedure for profiling purposes.

18. The computer apparatus of claim 13, wherein the retrieval mechanism, the determination mechanism, the comparison mechanism, and the indication mechanism are implemented in assembly code so as not to use any stack space.

* * * * *

UNITED STATES PATENT AND TRADEMARK OFFICE
CERTIFICATE OF CORRECTION

| | |
|---|---|
| PATENT NO. | : 7,181,733 B2 |
| APPLICATION NO. | : 10/346520 |
| DATED | : February 20, 2007 |
| INVENTOR(S) | : Kanoj Sarcar |

Page 1 of 1

It is certified that error appears in the above-identified patent and that said Letters Patent is hereby corrected as shown below:

In claim 1 (at column 5, line 30), please add the word --operation-- after the word "compilation" so that the phrase reads --during a prior compilation operation;--.

In claim 1 (at column 5, line 31), please add the word --the-- between "space" and "procedure" so that the phrase reads "how much stack space the procedure will use,".

In claim 7 (at column 5, line 67), please delete the word "deyermining" and replace it with the word --determining--.

In claim 7 (at column 6, line 5), please add a space between the words "stack" and "overflow".

In claim 7 (at column 6, line 7), please add the word --operation-- after the word "compilation" so that the phrase reads --during a prior compilation operation,--.

In claim 13 (at column 6, line 34), please delete the word "An" and replace it with the word --A-- so that the phrase reads "A computer apparatus".

Signed and Sealed this

Fifteenth Day of May, 2007

JON W. DUDAS
*Director of the United States Patent and Trademark Office*